(12) United States Patent
Jones

(10) Patent No.: US 7,718,142 B2
(45) Date of Patent: May 18, 2010

(54) SYSTEM AND PROCESS FOR TREATING SULFUR

(75) Inventor: Ronald E. Jones, Friendswood, TX (US)

(73) Assignee: S & B Engineers and Constructors, Ltd., Houston, TX (US)

( * ) Notice: Subject to any disclaimer, the term of this patent is extended or adjusted under 35 U.S.C. 154(b) by 0 days.

(21) Appl. No.: 12/111,612

(22) Filed: Apr. 29, 2008

(65) Prior Publication Data

US 2008/0267830 A1 Oct. 30, 2008

Related U.S. Application Data

(62) Division of application No. 10/652,385, filed on Aug. 29, 2003, now Pat. No. 7,393,513.

(51) Int. Cl.
*B01D 50/00* (2006.01)
(52) U.S. Cl. .................................. 422/168; 423/242.1
(58) Field of Classification Search ................. 422/168; 423/242.1; 23/295 S
See application file for complete search history.

(56) References Cited

U.S. PATENT DOCUMENTS 4,781,910 A * 11/1988 Van Dijk .................... 423/221

\* cited by examiner

*Primary Examiner*—Edward M Johnson
(74) *Attorney, Agent, or Firm*—Conley Rose, P.C.

(57) ABSTRACT

An apparatus configured for treating sulfur at an elevated pressure. Embodiments of the apparatus comprises a vessel into which the sulfur is injected and a device for alleviating the pressure of the sulfur.

18 Claims, 3 Drawing Sheets

SYSTEM AND PROCESS FOR TREATING SULFUR

REFERENCE TO RELATED APPLICATIONS

This application is a divisional application of U.S. patent application Ser. No. 10/652,385 filed date Aug. 29, 2003 now U.S. Pat. No. 7,393,513 incorporated herein by reference in its entirety for all purposes.

STATEMENT REGARDING FEDERALLY SPONSORED RESEARCH OR DEVELOPMENT

Not applicable.

BACKGROUND

Natural gas, as it comes from the ground, may contain impurities. One impurity that is often found in natural gas is sulfur, particularly sulfur in the form of $H_2S$. It may be desirable to remove the sulfur from a natural gas stream because, for example, it may prematurely corrode pipelines and it also may act as a poison to catalysts in downstream processes. One method of removing sulfur from a natural gas process is the Claus Process. The Claus Process generally consists of several steps: (1) oxidizing a portion of the $H_2S$ to form some elemental sulfur and some $SO_2$ and (2) reacting some of the remaining $H_2S$ and $SO_2$ to form elemental sulfur and water. The sulfur produced in the Claus Process is generally produced at near atmospheric pressure (e.g., less than about 15 psig).

Another method of removing sulfur from a gas stream is through the direct partial oxidation of the $H_2S$ to produce water and elemental sulfur. Generally, in this partial oxidation process, a stream containing up to about 3% $H_2S$ is partially oxidized over a catalyst to produce, inter alia, elemental sulfur at elevated pressures (e.g., greater than about 15psig). See generally, U.S. Pat. Nos. 5,271,907 and 6,099,819, incorporated herein by reference. The methods of processing sulfur at near atmospheric pressure may not work properly when handling elemental sulfur at elevated pressures. Additionally, other high pressure treatment processes may be capital intensive, may require many moveable parts, which may require frequent maintenance and/or possibly expose workers and operators to high pressure sulfur. Thus, there is a need for a process for processing sulfur at elevated pressures which alleviates or eliminates one or more of these concerns.

SUMMARY

Disclosed herein is a process for treating sulfur at elevated pressures wherein the sulfur may be separated from the process gas, sent to a transfer vessel, and the transfer vessel is vented to depressurize the sulfur to near atmospheric pressure. The sulfur may then be transferred to ambient storage or any other desirable use.

DETAILED DESCRIPTION

Figure 1:
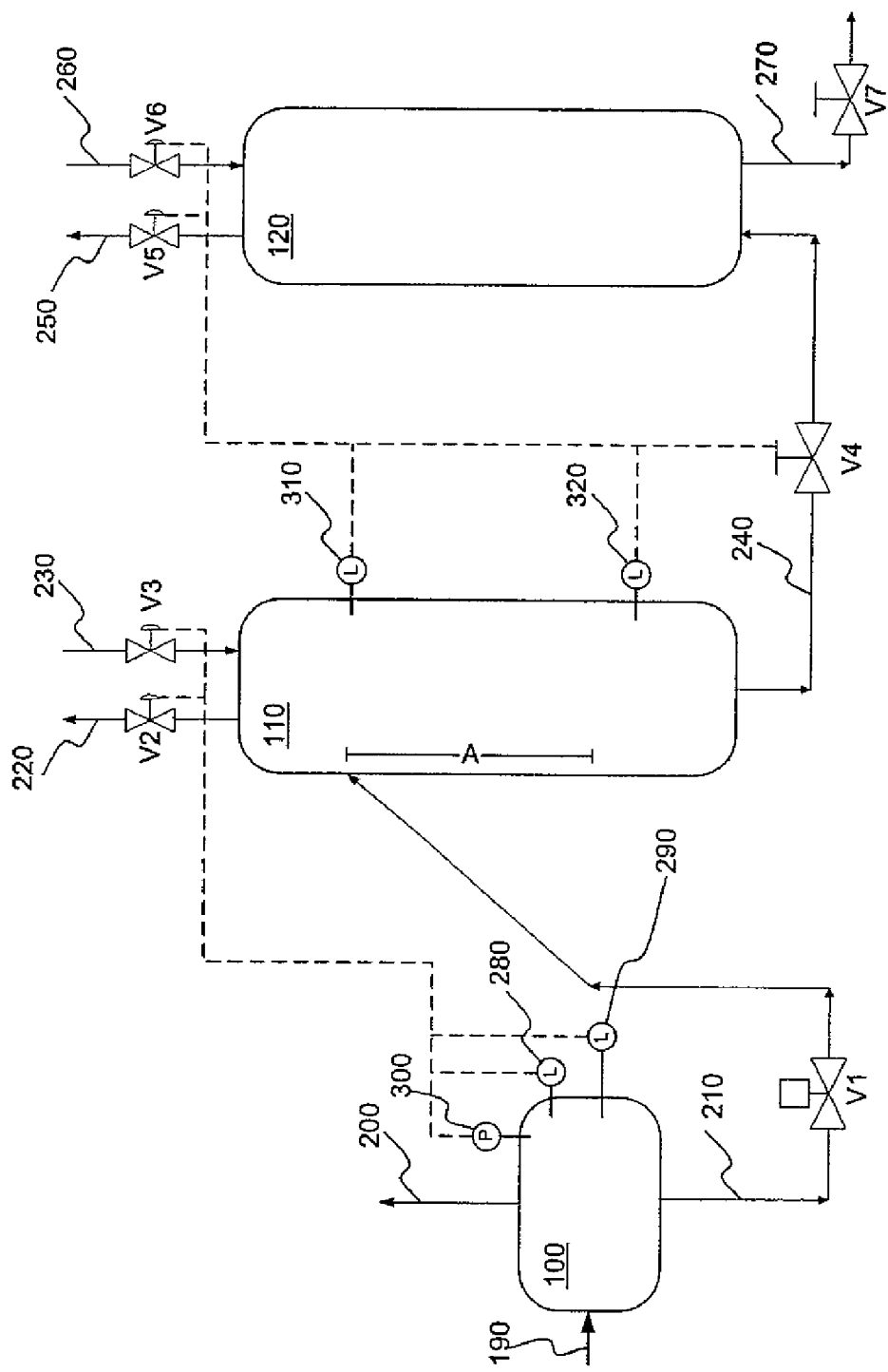
FIG. 1 is a schematic drawing of a system for treating sulfur in accordance with embodiments of the present invention.

Referring now to FIG. 1, there is shown a system comprising a product separator 100, a pressurized sulfur storage vessel 110, a sulfur transfer vessel 120, and valves V1, V2, V3, V4, V5, V6, and V7. In operation, sulfur and process gas (e.g., $H_2O$ and/or $H_2$) at elevated pressure (e.g., above about 15 psig) flow continuously or semi-continuously into process separator 100 through inlet line 190. Most of the process gas exits separator 100 through gas outlet 200. Likewise, most of the sulfur exits separator 100 through sulfur outlet 210, through valve V1 and into sulfur storage vessel 110.

At steady state, the pressure of storage vessel 110 is maintained equal to the pressure of separator 100 (e.g., about 70 psig) less the hydrostatic head of the sulfur as it rises through elevation A before entering storage vessel 110. In some embodiments the pressure of storage vessel 110 may be about 65 psig. Elevation A may be adjusted as desired to provide the desired pressure drop between vessels 100 and 110. In some embodiments, elevation A may be about 7.7 feet. Pressurized gas may be injected or released through gas lines 230 and 220 respectively so as to maintain the desired pressure in storage vessel 110. For example, an automatic or manual level control sensors 280 and 290 may be introduced into vessel 100. If the level of sulfur in separator 100 increases above a desired level, as indicated by level sensor 280, valve V2 may be opened and gas released to decrease the pressure in vessel 110, thereby increasing the flow rate of sulfur from the separator through sulfur line 210. Likewise, if the level of sulfur in separator 100 decreases below a desired level, as indicated by level sensor 290, valve V3 may be opened and gas injected so as to increase the pressure in vessel 110, thereby decreasing the flow rate of sulfur from the separator through sulfur line 210. Similarly, if the operating pressure in separator 100 changes, as indicated by pressure sensor 300 it may be necessary to increase or decrease the pressure in vessel 110 correspondingly.

As the level of sulfur in storage vessel 110 reaches a desired level, as indicated, e.g., by level sensor 310, the pressure in transfer vessel 120 may be increased (automatically by a control device or manually) to just below that of storage vessel 110. For example, if storage vessel 110 is at 100 psig, transfer vessel 120 may be brought to, e.g., 50 psig (via, e.g., high pressure gas line 260) and valve V4 opened to allow sulfur to flow from storage vessel 110 to transfer vessel 120. Additionally, vessel 120 may be vented through, e.g., valve V5 as vessel 120 is filled. Valve V4 can be closed when the sulfur level in vessel 110 reaches a desired lower level (e.g., its minimum safe operating level). This closure of valve V4 can occur manually or via an automated device that closes V4 in response to a signal from a level indicator 320 in vessel 110. Once the sulfur has been transferred from vessel 110 into transfer vessel 120 and valve V4 has been closed, the pressure in vessel 120 may be reduced to near atmospheric pressure (e.g., through gas release line 250) and the sulfur transferred to atmospheric or near atmospheric storage (e.g., 0 to about 5 psig) through sulfur removal line 270. Once the sulfur level in vessel 120 reaches its desired lower level, valve V7 may be closed and vessel 120 may then be repressurized to receive sulfur from storage vessel 110, and the sequence may be repeated. The closure and repressurization may be manual or automatic via a control device. In some embodiments, sulfur production may be about 10 tons/day.

In some embodiments, either or both of vessels 110 and 120 may have a diameter of about 4 feet and a height of about 20 feet.

Figure 2:
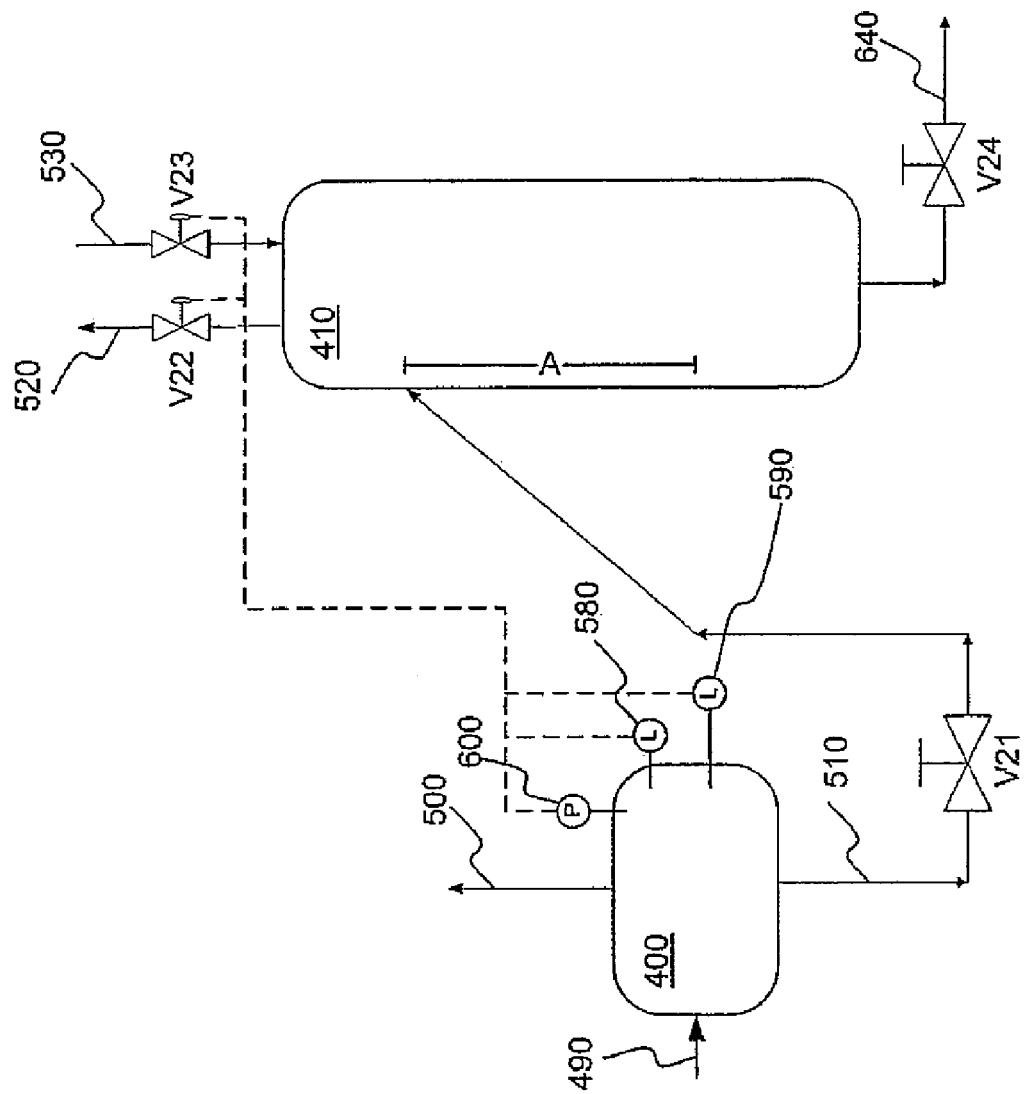
FIG. 2 is a schematic drawing of a second system for treating sulfur in accordance with embodiments of the present invention.

Referring now to FIG. 2, there is shown a separator 400, a sulfur transfer vessel 410, and valves V21, V22, V23, and V24. In operation, sulfur and process gas (e.g., $H_2O$ and/or $H_2$) at elevated pressure (e.g., above about 15 psig) flow continuously or semi-continuously into process separator 400 through inlet line 490. Most of the process gas exits separator 400 through gas outlet 500. Likewise, most of the sulfur exits separator 400 through sulfur outlet 510, through valve V21 and into sulfur storage vessel 410.

In operation, when the sulfur level of separator 400 reaches the desired level, valve 21 may be opened to allow sulfur to flow from separator 400 to vessel 410. During transfer of sulfur from separator 400 to vessel 410, it is desirable to keep the pressure of vessel 410 just below that of separator 400. Pressurized gas may be injected or released through gas lines 530 and 520 respectively so as to maintain the desired pressure in storage vessel 410. So long as the pressure of vessel 410 is less than the pressure of separator 400 less the hydrostatic head of the sulfur in transfer line 510, sulfur will flow from separator 400 to vessel 410. For example, an automatic or manual level control sensors 580 and 590 may be introduced into vessel 400. If the level of sulfur in separator 400 increases above a desired level, as indicated by level sensor 580, valve V22 may be opened and gas released to decrease the pressure in vessel 410, thereby increasing the flow rate of sulfur from the separator through sulfur line 510. Likewise, if the level of sulfur in separator 400 decreases below a desired level, as indicated by level sensor 590, valve V23 may be opened and gas injected so as to increase the pressure in vessel 410, thereby decreasing the flow rate of sulfur from the separator through sulfur line 510. Similarly, if the operating pressure in separator 400 changes, as indicated by pressure sensor 500 it may be necessary to increase or decrease the pressure in vessel 410 correspondingly.

As the level of sulfur in vessel 410 reaches a desired level, valve V21 may be closed and the pressurized sulfur in vessel 410 vented through gas release line 520 to the desired pressure (e.g., atmospheric) and the sulfur transferred to atmospheric or near atmospheric storage (e.g., 0 to about 5 psig) through sulfur removal line 640. Once the sulfur level in vessel 410 reaches its desired lower level, valve V24 may be closed and vessel 410 may then be repressurized to receive sulfur from separator 400, and the sequence may be repeated. The closure and repressurization may be manual or automatic via a control device.

Figure 3:
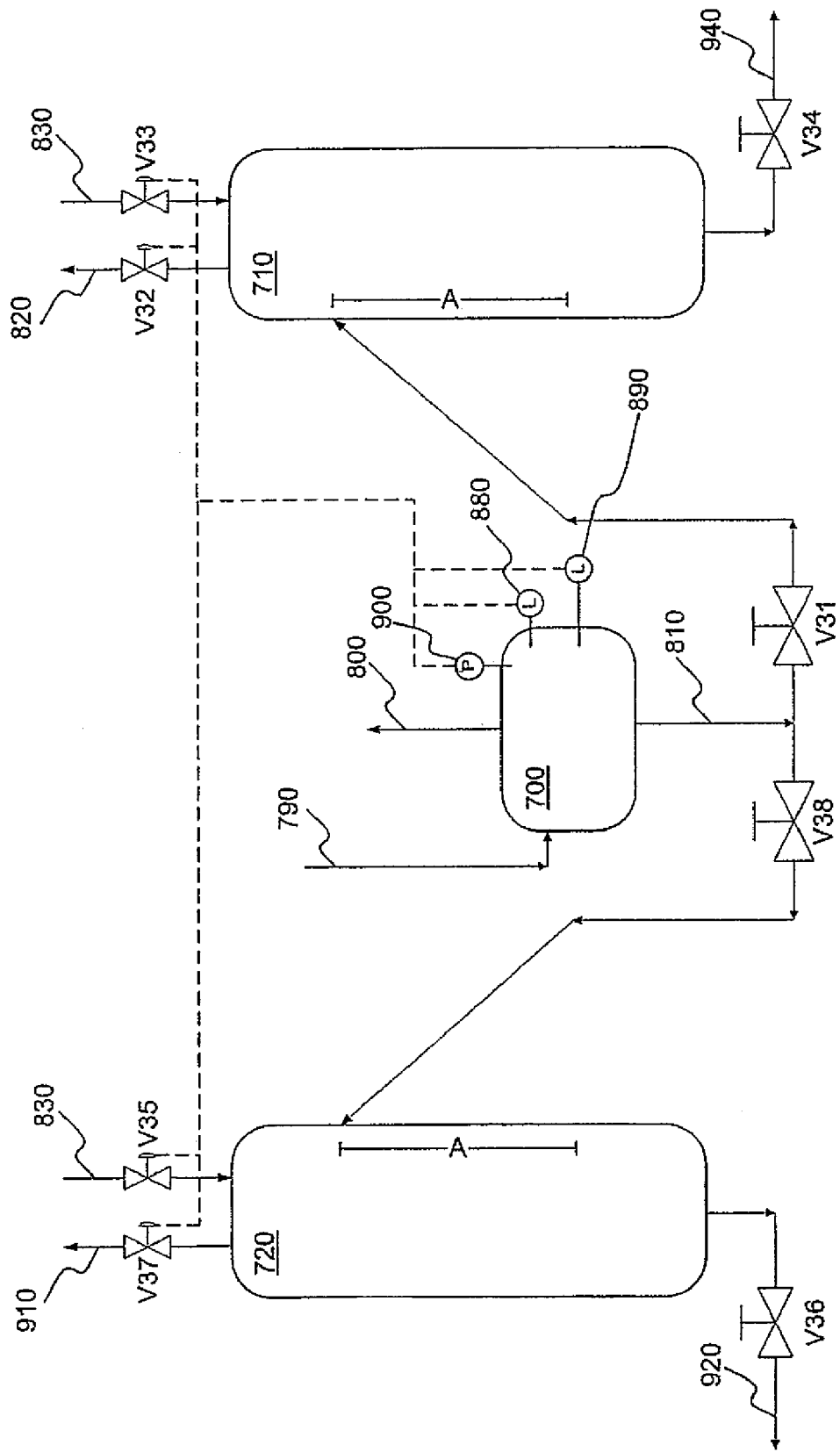
FIG. 3 is a schematic drawing of a third system for treating sulfur in accordance with embodiments of the present invention.

Referring now to FIG. 3, there is shown an embodiment in which two transfer vessels may be operated alternately in parallel. There is shown separator 700, first transfer vessel 710, second transfer vessel 720, and valves V31, V32, V33, V34, V35, V36, V37, and V38. In short, one vessel is filled with sulfur from separator 700, the valve between the filled vessel and the separator is closed, and the sulfur in the filled vessel is vented to the desired pressure (i.e., atmospheric or near atmospheric). Once the pressure of the sulfur is reduced as desired, the sulfur can be transferred to its destination (e.g., storage or a process). For the purpose of this disclosure, vessel 720 will be filled first, however, the order of the steps may be changed such that another vessel is filled first. Additionally, in some embodiments, it may be desirable to allow sulfur to transfer to both vessels simultaneously.

In operation, sulfur and process gas are injected into separator 700, sulfur exits separator 700 through sulfur outlet 810 and gas exits through gas outlet 800. Valves V38 is open and the pressure of vessel 720 may be just below that of the separator 700 less the hydrostatic head of the sulfur flowing from the separator 700 to vessel 720. The flow of sulfur flowing from separator 700 to vessel 720 may be controlled by controlling the pressure in vessel 720 by injecting of venting gas through valves V35 or V37 respectively. To increase the rate of sulfur transfer, gas may be vented. Conversely, to decrease the rate of sulfur transfer, high pressure gas may be injected. Once the amount of sulfur in vessel 720 reaches its desired upper level, valve V38 is closed, valve V31 is opened, and the high pressure sulfur in vessel 720 is vented until the sulfur reaches its desired pressure. The sulfur may then be transferred to storage or any other desirable use. While the sulfur in vessel 720 is brought to atmospheric pressure, vessel 710 may be filled with sulfur from separator 700, and the same process repeated.

The above discussion is meant to be illustrative of the principles and various embodiments of the present invention. Numerous variations and modifications will become apparent to those skilled in the art once the above disclosure is fully appreciated. For example, the embodiments of FIG. 1 and/or FIG. 3 may be modified to include 3 or more vessels. It is intended that the following claims be interpreted to embrace all such variations and modifications.

What is claimed is:

1. An apparatus for handling molten sulfur at elevated pressure, comprising:
   a first tank having an inlet and an outlet,
   a fluid channel traversing a vertical distance from the first tank outlet, said fluid channel having first and second ends, said first fluid channel end in fluid communication with said first tank outlet;
   a second tank having a fluid inlet and a fluid outlet, said fluid inlet being in fluid communication with said first channel second end and disposed at a vertical distance above the fluid channel first end.

2. The apparatus according to claim 1, further including a third tank having a fluid inlet in fluid communication with said second tank fluid outlet and having a fluid outlet in fluid communication with the first tank.

3. The apparatus according to claim 1, wherein the level of molten sulfur in said second tank is maintained below said second tank fluid inlet by a first gas line.

4. The apparatus according to claim 1, wherein said first and second tanks comprise first and second overhead spaces, respectively, and wherein said first and second overhead spaces are in fluid communication via a first gas line.

5. The apparatus according to claim 1, wherein the rate of flow through said first gas line is controlled in response to a measurement of gas pressure within said second tank.

6. The apparatus according to claim 1, wherein the rate of flow through said fluid channel is controlled by controlling the gas pressure in said second tank.

7. The apparatus according to claim 1, wherein the rate of flow through said fluid channel is controlled by controlling the gas pressure differential between said first tank and said second tank.

8. The apparatus according to claim 2, wherein the level of molten sulfur in said third tank is maintained below said third tank fluid inlet.

9. The apparatus according to claim 2, wherein said second and third tanks comprise second and third overhead spaces, respectively, and wherein said second and third overhead spaces are in fluid communication via a second gas line.

10. The apparatus according to claim 2, wherein the the second gas line comprises a molten sulfur flow control in response to a measurement of gas pressure within said third tank.

11. The apparatus according to claim 10, wherein the rate of flow through said second gas line is controlled by controlling the gas pressure in said third tank.

12. The apparatus according to claim 10, wherein the rate of flow through said second gas is controlled by controlling the gas pressure differential between said second tank and said third tank.

13. An apparatus for handling molten sulfur at elevated pressure, comprising:
- a first tank having an inlet and at least one outlet,
- a fluid channel traversing a vertical distance, said fluid channel having first and second ends, said first fluid channel end in fluid communication with said first tank at least one outlet;
- at least one second tank having a fluid inlet and a fluid outlet, said fluid inlet being in fluid communication with said first channel second end.

14. The apparatus according to claim 13, wherein the level of molten sulfur in said at least one second tank is maintained below said second tank fluid inlet.

15. The apparatus according to claim 13, wherein said first and second tanks have first and second overhead spaces, respectively, and wherein said first and second overhead spaces are in fluid communication via a first gas line.

16. The apparatus according to claim 13, wherein the rate of flow through said first gas line is controlled in response to a measurement of gas pressure within said at least one second tank.

17. The apparatus according to claim 13, wherein the rate of flow through said fluid channel is controlled by controlling the gas pressure in said at least one second tank.

18. The apparatus according to claim 13, wherein the rate of flow through said fluid channel is controlled by controlling the gas pressure differential between said first tank and said at least one second tank.

* * * * *